July 13, 1954   O. J. BORROWDALE   2,683,524
ELEVATOR CONVEYER HAVING MOTOR ROTATED CELLS AND GATES
Filed March 16, 1953   9 Sheets-Sheet 2

July 13, 1954  O. J. BORROWDALE  2,683,524
ELEVATOR CONVEYER HAVING MOTOR ROTATED CELLS AND GATES
Filed March 16, 1953  9 Sheets-Sheet 3

INVENTOR.
Orville J. Borrowdale
BY
Gary, Desmond & Parker
Attys.

July 13, 1954     O. J. BORROWDALE     2,683,524
ELEVATOR CONVEYER HAVING MOTOR ROTATED CELLS AND GATES
Filed March 16, 1953     9 Sheets-Sheet 4

Inventor:
Orville J. Borrowdale
By:- Gray, Desmond & Parker
Attys.

July 13, 1954     O. J. BORROWDALE     2,683,524
ELEVATOR CONVEYER HAVING MOTOR ROTATED CELLS AND GATES
Filed March 16, 1953     9 Sheets-Sheet 5

Inventor:
Orville J. Borrowdale
By: Gary, Desmond & Parker
Att'ys.

July 13, 1954     O. J. BORROWDALE     2,683,524
ELEVATOR CONVEYER HAVING MOTOR ROTATED CELLS AND GATES
Filed March 16, 1953     9 Sheets-Sheet 6

Inventor:
Orville J. Borrowdale
By:- Gary, Desmond & Parker
Att'ys.

July 13, 1954  O. J. BORROWDALE  2,683,524
ELEVATOR CONVEYER HAVING MOTOR ROTATED CELLS AND GATES
Filed March 16, 1953  9 Sheets-Sheet 7

Inventor:
Orville J. Borrowdale
By:- Gary, Desmond & Parker
Attys.

July 13, 1954  O. J. BORROWDALE  2,683,524
ELEVATOR CONVEYER HAVING MOTOR ROTATED CELLS AND GATES
Filed March 16, 1953  9 Sheets-Sheet 8

Inventor:
Orville J. Borrowdale
By:- Gary, Desmond & Parker
Att'ys.

July 13, 1954   O. J. BORROWDALE   2,683,524
ELEVATOR CONVEYER HAVING MOTOR ROTATED CELLS AND GATES
Filed March 16, 1953   9 Sheets-Sheet 9

Inventor:
Orville J. Borrowdale
By:- Gary, Desmond & Parker
Attys.

Patented July 13, 1954

2,683,524

UNITED STATES PATENT OFFICE 2,683,524

ELEVATOR CONVEYER HAVING MOTOR ROTATED CELLS AND GATES

Orville J. Borrowdale, Chicago, Ill.

Application March 16, 1953, Serial No. 342,578

14 Claims. (Cl. 198—211)

1

This invention relates to improvements in an elevator-conveyor and refers particularly to a device for conveying or elevating materials such as coal, limestone, ore or the like from one elevation to a higher elevation.

One of the important objects of the present invention resides in the provision of a device for elevating, in a continuous manner, materials such as coal, limestone, ore or the like where said materials are contained in a compartment or space which is more or less cramped and does not permit the use of conventional conveyors, hoists or the like.

Another important feature of the present invention resides in a conveyor-elevator which comprises a plurality of endlessly moving cells or buckets which may be filled at their lower path of travel and are emptied at their upper path of travel, means being contemplated for rapidly unloading said cells at their upper travel in a relatively short space of time permitting a rapid cyclic operation of the device.

A further important feature of the invention resides in the provision of means for inverting the cells during their travel, gates being provided for the prevention of premature leaking or spilling of the material being elevated, including electric motor driven means for periodically opening and closing the gates, including means for periodically actuating said electric motors at predetermined points in the path of travel of the cell.

Another important feature of the invention resides in motor-operated means for rotating said cells about their respective axes either continuously during the travel of the cells or intermittently during said travel.

Other objects and advantages of the present invention will be apparent from the accompanying drawings and following detailed description.

2

Referring in detail to the drawings, 1—1 indicate vertical frame members connected together at the front and rear by bottom frame members 2 and top frame members 3. The front and rear frame members are joined in spaced relationship by channel irons 4. At the upper four corners of the framework thus formed loop members 5 are positioned to receive the hooks or chains of a crane or hoist whereby the framework, which carries the elevator-conveyor to be hereinafter more fully described, may be moved from place to place, as the situs of the material to be carried demands.

An elevator-conveyor mechanism, designated generally by the reference numeral 6, is carried within the framework hereinbefore described, the elevator-conveyor mechanism moving within the framework in a substantially circular path. On the framework, described, a pair of spaced substantially circular outer race supports 7 are carried. The elevator-conveyor frame comprises essentially a pair of spaced inner race supports 8 held in spaced relationship by a plurality of cross-members 9. An outer circular race 10 is carried by each of the outer race supports 7 and an inner circular race 11 is carried by each of the inner race supports 8, rollers 12 being positioned between each pair of races 10 and 11, whereby the elevator-conveyor frame is rotatably carried by the stationary framework.

On the inner portion of the inner race support 8 on one side of the elevator-conveyor frame, a relatively large ring gear 13 is carried. A pair of driving gears 14 mesh with the ring gear to move the elevator-conveyor frame upon the rollers 12. The stationary framework, hereinbefore described comprises horizontal beams 15 and vertical supporting beams 16 upon which an electric driving motor 17 is positioned. A drive sprocket 18 is mounted upon the shaft of motor 17 around which sprocket chain 19 is trained. A conventional speed reducer 20 is also mounted upon the beams 15 and the input shaft thereof carries a sprocket wheel 21 over which chain 19 is trained and whereby power is transmitted to the speed reducer. The speed reducer has output shaft 22 upon which pinion 23 is mounted, the pinion being in mesh with the two driving gears 14, which in turn, mesh with ring gear 13. In this fashion the elevator-conveyor frame is driven in a circular path.

In view of the fact that one of the advantages of the present invention is its compactness whereby it may be disposed in cramped spaces, I have found that the main drive mechanism comprising the motor 17, the speed reducer 20 and the various gears may advantageously be positioned at the central portion of the elevator-conveyor frame, as shown. However, it is to be understood that, if desired, the main drive mechanism may be positioned in either of the upper or lower corners of the stationary framework and still be disposed within the confines of the stationary frame. Of course, if any of the latter positions be employed, the elevator-conveyor frame will be driven through an external ring gear instead of the internal ring gear 13.

A plurality of cells or buckets 24 are carried upon the elevator-conveyor frame, said cells being circular in transverse cross-section and being positioned on the rotatable frame with their axes disposed radially. As many cells 24 may be employed upon the rotatable elevator-conveyor frame as desired and since all cells and their accompanying mechanisms are identical, for purpose of clarity of description only one will be described in detail.

Each cell has a closed bottom 25 and a shaft 26 extends through the center of the bottom, the shaft and bottom being relatively rotatable. A brace member 27 extends transversely across the elevator-conveyor frame and is secured at opposite ends thereto, the brace 27 being rigidly connected to, and supporting the shaft 26. A spider 28 having crossed arms 29 is rigidly mounted upon shaft 26, the arms 29 extending radially to the inner wall of the cell and each of said arms, at its end carries a vane 30 which extends upwardly along the inner wall of the cell. As will be hereinafter more fully described, during operation of the device, the cell rotates while the vanes 30 remain stationary relative thereto whereby the vanes and arms function to scrape the side wall and bottom of the cell and loosen and prevent adherence of material carried therein thereby facilitating dumping thereof.

A plate 31, secured to the elevator-conveyor frame, is positioned adjacent the open mouth of each cell 24, said plate being provided with an opening conformable substantially to the open mouth of the cell. Depending from plate 31 an annular funnel-like element 32 carries at its lower end a ring 33 which loosely circumscribes the cell mouth.

A bearing ring 34 is mounted upon each cell which functions as a bearing surface or track for lateral guide rollers 35 and 36, each of which are supported by roller brackets 37 and 38, respectively. Roller brackets 37, of which there are two, are mounted upon a frame member 39 and roller brackets 38, of which there are also two, are mounted on frame section 40. Thus, the cell 24 is rotatable supported laterally adjacent the open portion thereof.

Figure 3:
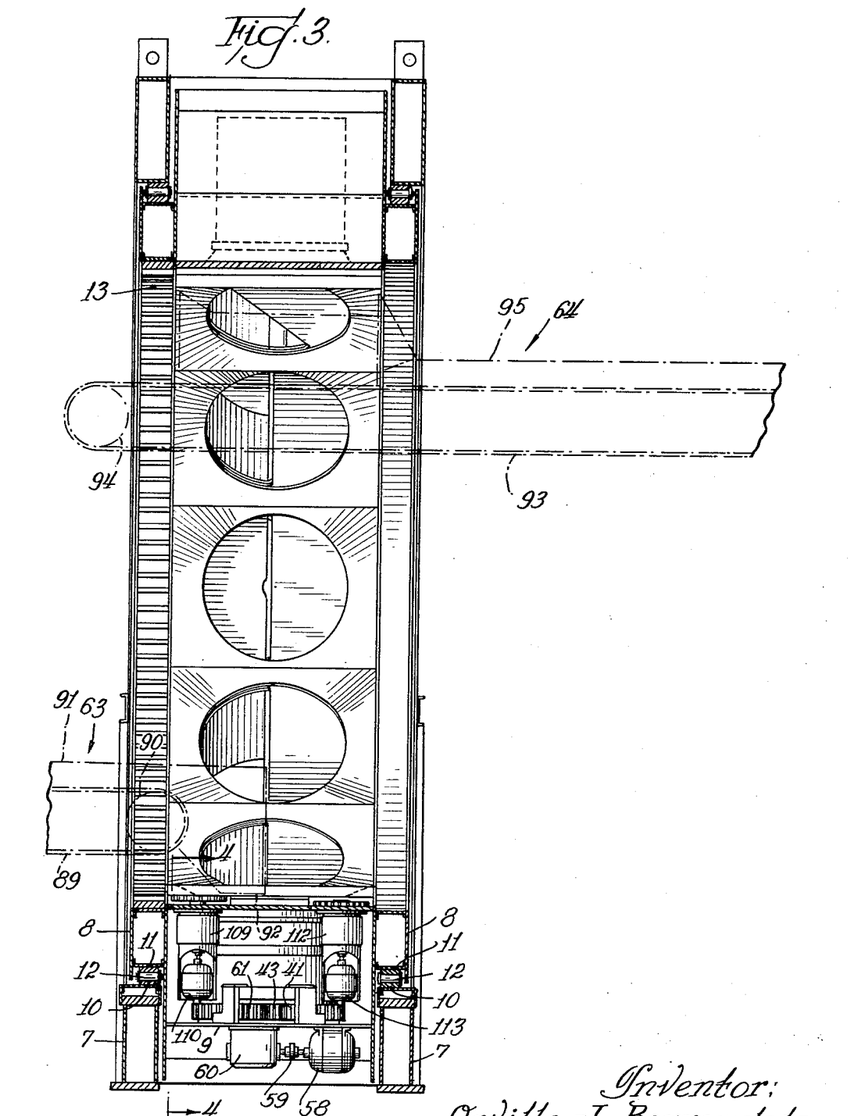
Fig. 3 is a sectional view of the device taken on line 3—3 of Fig. 1.

Also mounted upon the outer surface of each cell, and spaced from the bearing ring 34, is a ring gear 41 and bearing ring 42 which may be formed integral with each other, if desired. The ring gear 41 meshes with a pinion 43 (Fig. 3) and is adapted to be driven by said pinion whereby the cell is rotated about its axis. The bearing ring 42 comprises a race or track for rollers 44 which are carried by roller brackets 45 and 46, said brackets being respectively supported by frame members 47 and 48. Thus the closed end portion of each of the cells is laterally supported for rotation about its axis.

Plates 49—49 and 50—50 are also carried by the frame members 47 and 48, respectively, and each of said plates supports a shaft 51—51 and 52—52. A roller 53 is carried upon each of said shafts, one pair of rollers bearing on the lateral surface of the ring gear 41 and the other pair of rollers bearing upon a lateral surface of the bearing ring 42. A similar set of plates 54 are mounted upon opposite side frame members 55 and each carries shafts 56 which carry rollers 57. The rollers 57 are also disposed in pairs which bear upon lateral surfaces of the ring gear 41 and bearing ring 42. In this fashion rollers 53 and 57 function as thrust bearings for the rotatable cell and support said cell axially during its rotation.

Each of the cells 24 are rotated at predetermined portions of the travel of the elevator conveyor, as will be hereinafter more fully described, and each of the cells is provided with its individual rotating means. A motor 58 carried by a portion of the frame member 9 is disposed adjacent each of the cells 24, the motor 58 being coupled by means of coupling 59 to a conventional speed reducer 60 which is also mounted upon a portion of the frame member 9. The output shaft of the speed reducer 60 carries a spur gear 61 which meshes with spur gear 43, which, as has been hereinbefore described, meshes with ring gear 41. The arrangement is such that when motor 58 is energized, the cell 24 is rotated about its axis, being supported during its rotation by the rollers 35, 36, 44, 53 and 57.

Figure 1:
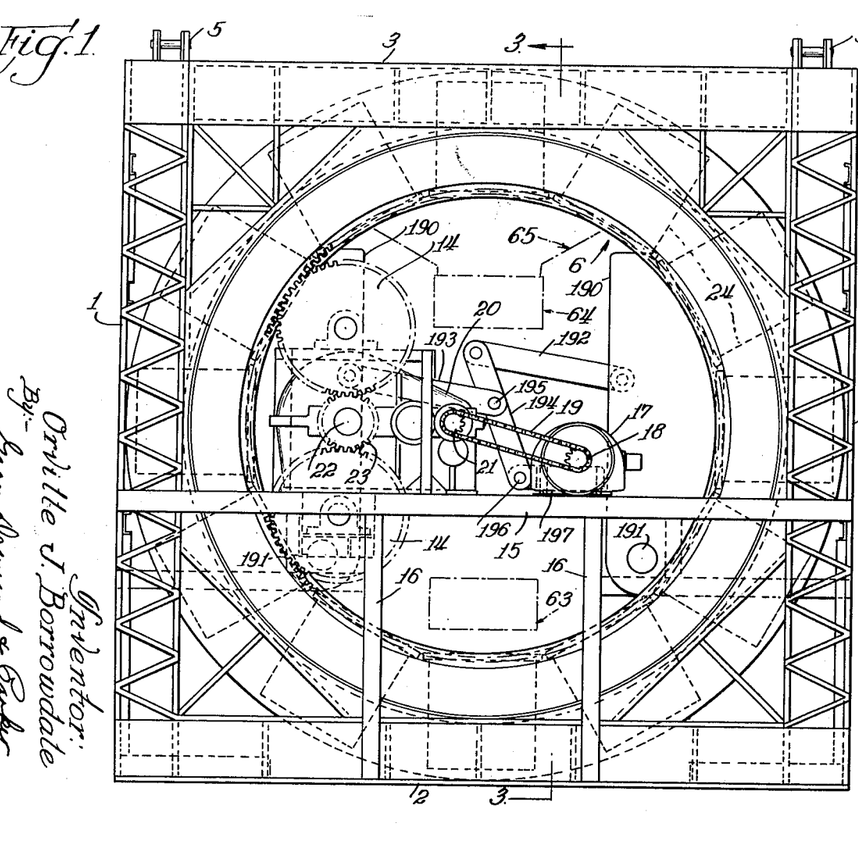
Fig. 1 is a front elevational view of the elevator-conveyor comprising the present invention.
Figure 2:
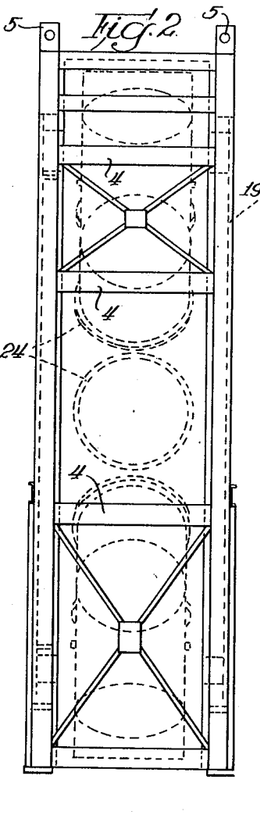
Fig. 2 is a side elevational view of the device.
Figure 9:
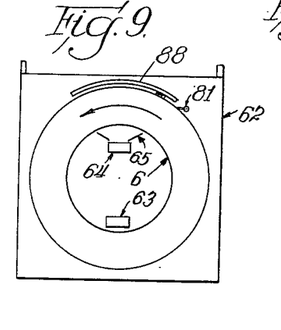
Fig. 9 is a diagrammatic view of the elevator-conveyor device showing the position of the switch-tripping mechanism for the motors which rotate the individual cells.

Referring particularly to Fig. 9, a diagrammatic view of the device is illustrated wherein 62 indicates the stationary frame hereinbefore described and shown in detail in Figs. 1 and 2 and the numeral 6 indicates the rotating elevator conveyor frame which carries the cells, a feed conveyor is shown diagrammatically at 63 wherein the material to be conveyed or elevated is fed to the individual cells at the lower portion of the travel of the elevator conveyor frame and a discharge conveyor 64 is diagrammatically illustrated positioned with respect to the rotating elevator conveyor at the upper portion of its travel. As will be hereinafter more fully described a trough 65 is associated with the discharge conveyor 64 and spans a portion of the arc of travel of the rotating elevator conveyor adjacent its upper portion. Each of the motors 58 is connected, by means of conductors 66, 67 and 68 to switch points 69, 70 and 71 respectively of a solenoid operated switch 72. Companion switch points 73, 74 and 75 are connected by means of conductors 76, 77 and 78 respectively to a source of three-phase alternating current. A solenoid 79 is connected across conductors 76 and 77 and is connected in series with switch points 80 of a limit switch 81. A core 82 is associated with the solenoid 79 and carries bridging elements 83 associated with the respective switch points of the solenoid switch 72. The limit switch 81 carries a pivoted arm 84 which at its free end carries a roller 85. A link 86 is pivotally connected at one end to the arm 84 and carries at its opposite end bridging element 87. The limit switch 81 is of such construction that it is normally open, that is, the bridging element 87 is normally in the position shown in full lines in Fig. 10. When the arm 84 is depressed the terminals 80 are bridged by the bridging element 87 and solenoid 79 is energized whereby the bridging elements 83 of the solenoid operated switch 72 function to complete the circuits to conductors 66, 67 and 68 whereby the cell motor 58 is energized.

Along a portion of the path of travel of the rotatable elevator conveyor 6 an arcuate cam rail 88 is positioned, said cam rail being disposed in the path of travel of each of the arms 84 and rollers 85 of the limit switches 81 associated with each of the cell motors. As the rotatable elevator conveyor 6 rotates and as the rollers 85 of each limit switch 81 contact the cam rail 88 the cell motor associated with said limit switch is actuated and the cell is rotated about its axis as long as the cam rail 88 depresses the arm 84. The cam rail 88 is disposed adjacent that portion of the arc of travel of the elevator conveyor 6 wherein the cells 24 move over the trough 65 associated with the discharge conveyor 64. Consequently, during the period of discharge of the material from the cells, as will be hereinafter more fully described, the cells which are discharging are simultaneously rotated and hence material carried therein will be agitated and the inner walls of the cells will be scrapped by the arms 29 and vanes 30. Of course, it is to be understood that the cam rail 88 may be of any desired length and may have a portion thereof so disposed that the cells will rotate prior to reaching the discharge zone. However, it is preferable that whether the cells are rotated before they reach discharge zone or not that they be rotated as they pass the discharge zone.

The feed conveyor 63, shown diagrammatically in Fig. 9, comprises an endless conveyor belt 89 which is trained around a pair of spaced rolls 90, only one of which is shown. A hood or trough 91 is associated with the upper pass of the belt 89 and terminates in a spout 92 which directs material carried on the belt into the lowermost cell 24. The discharge conveyor 64, also shown diagrammatically in Fig. 9, comprises an endless conveyor belt 93 which is trained around a pair of spaced rolls 94, only one of which is shown, the upper pass of said belt being also provided with a trough 95. It will be noted, with a specific reference to Fig. 1, that the end of the conveyor 64 is positioned beneath a cell 24 upon the elevator-conveyor 6 which is at its uppermost position. The trough, shown diagrammatically in Fig. 9, terminates in tapered sides 65 within the elevator-conveyor which span a predetermined arc of a length equal to that spanned by two cells 24, specifically a whole centrally positioned cell and a half of both a leading and lagging cell adjacent said central cell. As has been hereinbefore described the cam rail 88 is positioned on the stationary frame of the device and preferably spans an arc substantially the same as the arc spanned by the trough sides 65 whereby the limit switch 81 associated with each cell upon the elevator conveyor is closed while the cells, in question, lie within the arc spanned by the conveyor trough sides 65

In view of the fact that the cells 24 at their lowermost position have their mouth facing upward so that said cells may be loaded and that during movement of the elevator-conveyor said cells are inverted, means is contemplated for closing the cells immediately after they are filled and again opening them when it is intended that they be discharged. This means is described as follows.

Figure 4:
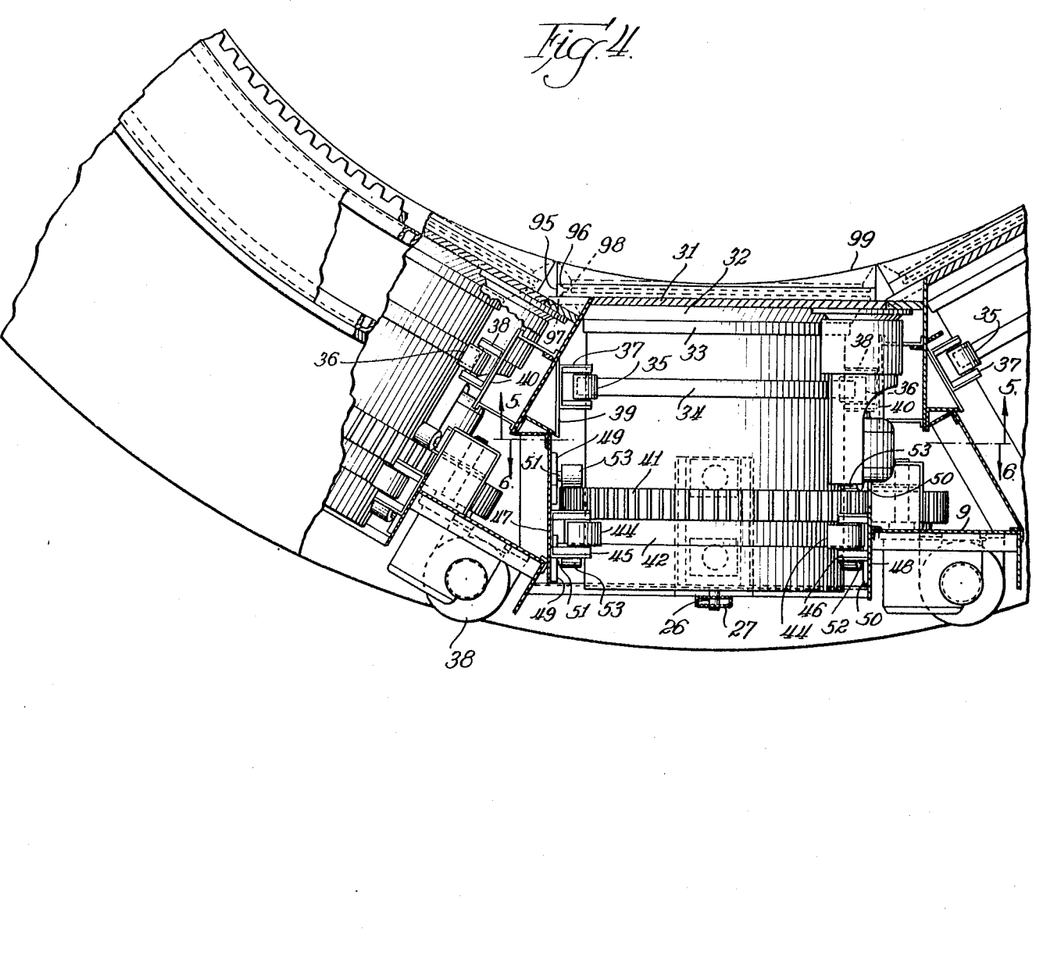
Fig. 4 is an enlarged detailed sectional view of one of the cells and its accompanying mechanisms.
Figure 5:
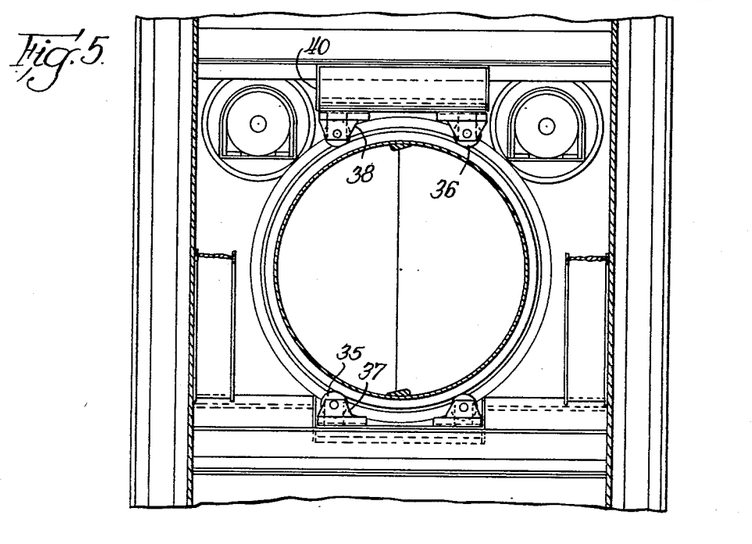
Fig. 5 is a sectional view taken on line 5—5 of Fig. 4.
Figure 6:
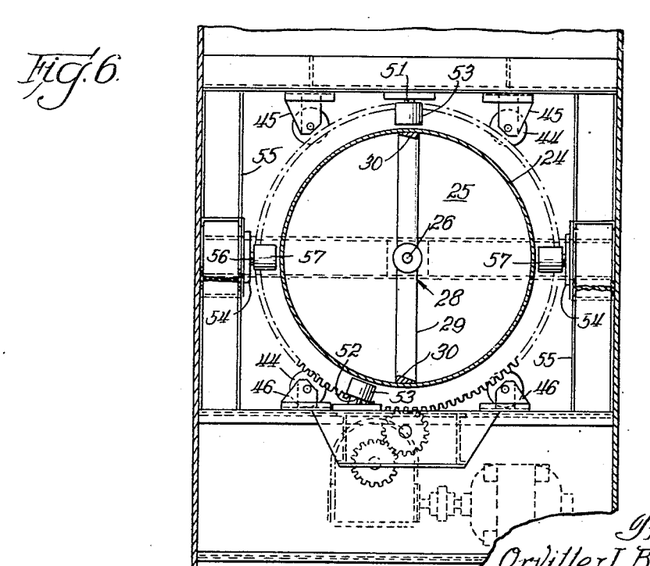
Fig. 6 is a sectional view taken on line 6—6 of Fig. 4.
Figure 7:
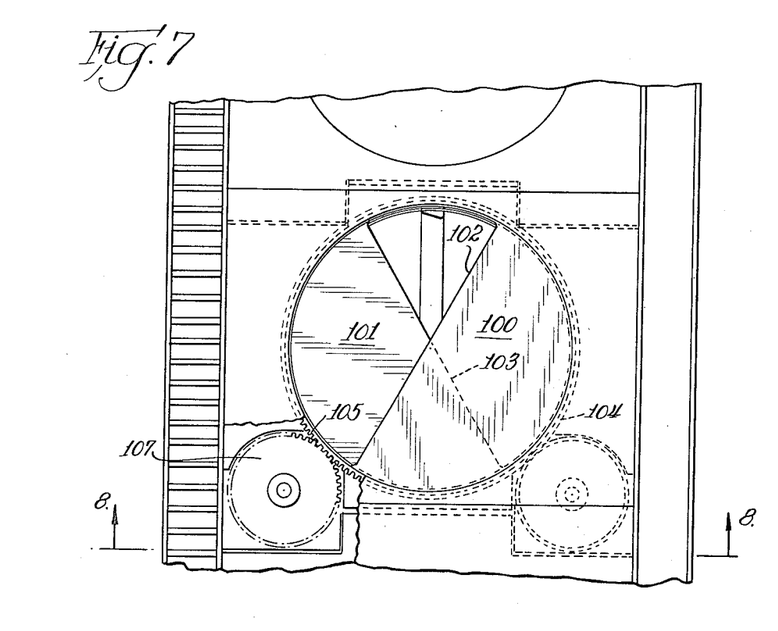
Fig. 7 is a top plan view of one of the cells, parts being broken away.
Figure 8:
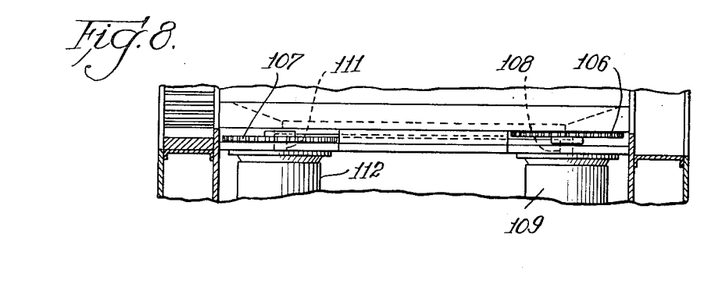
Fig. 8 is a fragmentary sectional view taken on line 8—8 of Fig. 7.

Referring particularly to Fig. 4, an annular gate guide ring 95 is positioned upon the upper surface of plate 31, said ring being of substantially T cross-section whereby annular grooves 96 and 97 are provided, said grooves being separated by rib 98. A casting 99 having a circular opening conforming with the openings in the gate guide ring, the plate 31 and the mouth of the cell 24 is positioned upon the gate guide ring 95 and defines one wall of the groove 96.

A pair of gates 100 and 101 are respectively positioned in grooves 96 and 97. Each of the gates 100 and 101 are circular in shape and each of the gates is provided with a substantially semi-circular opening 102 and 103 respectively, the openings being defined by a diametral edge of the gate and a ring-like portion of each gate. The arrangement is such that the gates are rotatable within the grooves 96 and 97 of the gate guide ring 95. The peripheral edge of the top gate 100 is provided with gear teeth 104 and similarly the peripheral edge of the lower gate 101 is provided with similar gear teeth 105, in each case the gear teeth being formed on the ring-like portion of the gate as well as on the semi-circular solid portion of the gate. In order to rotate the gates a gear 106 meshes with the teeth 104 of the top gate 100 and a similar gear 107 meshes with the gear teeth 105 on the periphery of the lower gate 101. Hence, when the gears 106 and 107 are rotated the gates 100 and 101 will be rotated in the guides 96 and 97 of the gate guide ring 95. The gear 107 is carried upon an output shaft 111 of a conventional speed reducing mechanism 112 which is similar to the mechanism 109 and the input shaft of the mechanism 112 is driven by an electric motor 113. The speed reducing mechanism 112 and motor 113 are formed unitary and are also supported by the plate 31.

Figure 11:
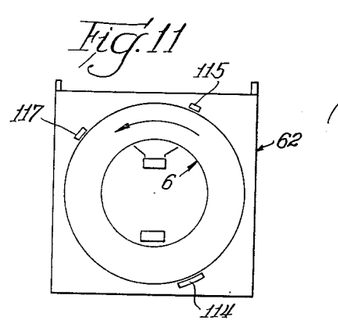
Fig. 11 is a view similar to Fig. 9 showing the positions of the switch-tripping mechanisms for the gate moving motors.
Figure 12:
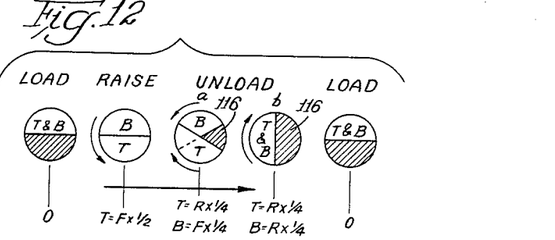
Fig. 12 is a diagrammatic view of a pair of cell gates at different sequential positions on the elevator-conveyor.

Referring particularly to Fig. 11 a diagrammatic view of the device comprising the present invention is illustrated showing particularly the position of the actuating means for energizing the motors 110 and 113. When a predetermined cell 24 is at its lowermost position immediately below the trough 92 of the conveyor 63 the solid portions of the top and bottom gates 100 and 101 respectively are in superimposed position. In Fig. 12 sequential diagrammatic views of the gate positions are shown. When the gates are in the position hereinbefore stated the relationship of the gates to each other is indicated in Fig.

12 by the legend "Load," the letters "T" and "B" indicate the top and bottom gates 100 and 101 respectively. In the "Load" position the top and bottom gates are in coincidence wherein the openings 102 and 103 are in coincidence which permits the cell to be loaded by the conveyor 63.

Immediately after the cell in question has moved beyond the load position a cam bar 114 functions to actuate motor 110, the arcuate length of the cam bar 114 being such that the motor will be energized for a sufficient length of time to move the top gate one-half turn. The relationship of the gates at this period is indicated by the legend "Raise" and it is shown that the top gate will then be in staggered relationship to the bottom gate and hence the cell mouth will be closed. Hence, when the cell in question leaves the arcuate position of the cam bar 114 the cell mouth will be closed until said cell reaches the arcuate position of a pair of parallel cam bars 115. The angular or arcuate position of the cam bars 115 is such as to bring the leading side of the cell in substantial radial alignment with the leading edge of the trough 65. In other words, the gates are caused to open by the cam bar 115 when the mouth of the cell in question commences to move over the trough 65. Referring particularly to Fig. 12 the operation of the gates during the unloading position is indicated by the legend "Unloading" as indicated by the circles $a$ and $b$. In this position each of the gates is given a quarter turn, both top and bottom gates moving in opposite directions. It will be noted by the sectioned portion 116 of the circle $a$ that the leading portion of the cell mouth opens first since this portion is the first to position itself within the angular confines of the trough 65. As the cell moves past the cam bar 115 the top and bottom gates will have completed their quarter openings and hence the top solid portions of the top and bottom gates will be in superimposed position exposing a complete half opening 116. It will be noted, however, that in this position the gates although in superimposed position similar to the position at "Load," the gates will be at right angles to the position which they occupy at "Load."

Thereafter the cell in question moves past the cam bars 117 wherein both the top and bottom gates are given a quarter turn, both gates turning in the same direction. The gates are now positioned in their original position and the cell in question is ready to pass beneath the conveyor trough 92 to be loaded.

Figure 13:
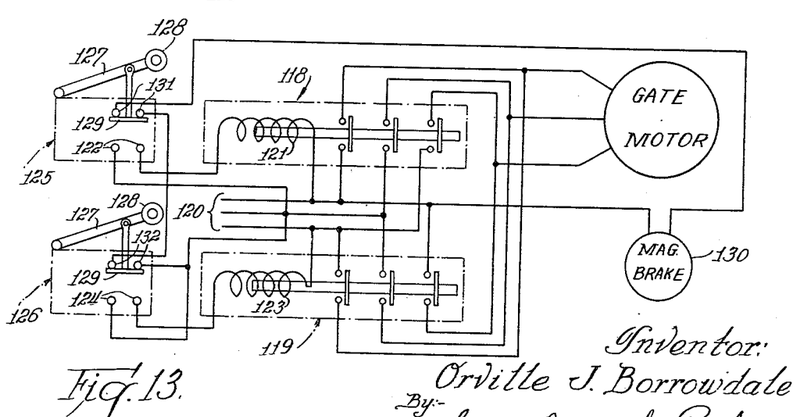
Fig. 13 is a wiring diagram for a gate-moving motor.

The wiring diagram for each of the gate motors is illustrated in Fig. 13, the legend "Gate Motor" intending to indicate either motor 110 or 112 since the wiring arrangement for each is the same. The "Gate Motor" is preferably an alternating current three-phase motor and may be connected through either solenoid operated switch 118 or solenoid operated switch 119 to the line 120, the direction of rotation of the motor being opposite when energized through switch 118 or 119. Solenoid 121 of switch 118 is connected to two phases of the line through switch points 122 and solenoid 123 being connected to two phases of the line through switch points 124, said switch points being carried respectively by limit switches 125 and 126. Each of the limit switches is conventional in construction and each carries a spring biased actuating arm 127 carrying a roller 128. A bridging element 129 is associated with each actuating arm which, when a predetermined arm is swung, bridges switch points 122 or 124 to actuate either solenoid 121 or 123, respectively. A magnetic brake 130 comprising a portion of each "Gate Motor" assembly and not specifically illustrated, is connected to two phases of the line 120 through switch points 131 and 132 of switches 125 and 126, respectively, that is, said switch points are in series and the magnetic brake is only actuated when both limit switches 125 and 126 are in their normal position.

It is to be understood that a circuit such as shown in Fig. 13 is associated with each motor 110 and 113 which in turn are associated with each cell 24. The limit switches 125 and 126 are so constructed that the bridging elements 129 normally close the switch points 131 and 132 and hence the magnetic brake 130 associated with each of the motors is energized. When the rotating elevator conveyor 6 moves, the actuating arm 127 of either of the limit switches 125 and 126 will be periodically swung to bridge either switch points 122 or 124 depending upon which direction the gate motor is adapted to be driven. For instance, when a cell in question moves past the arcuate cam bar 114 the gate motor 110 associated with the cell in question will have one of its limit switches 125 or 126 actuated whereby the circuit to the magnetic brake motor 110 will be de-energized and the circuit to the appropriate solenoid 121 or 123 will be energized to operate motor 110 in such a direction as to cause the top gate to move one-half turn whereby the cell mouth will be closed. When the cell in question passes the arcuate cam bars 115, one limit switch associated with each gate motor 110 and 113 will be actuated, for instance, the limit switch 125 of gate motor 110 may be actuated whereas the limit switch 126 of gate motor 113 will be actuated. In other words, the gate motors 110 and 113 will be so actuated as to rotate in opposite directions whereby the top and bottom gates will move in opposite directions a quarter turn. When the cell in question moves past the arcuate cam bars 117 the same limit switch in each of the circuits of the motors 110 and 113 will be actuated whereby both gate motors 110 and 113 will be energized and will rotate in the same direction whereby the gates will be rotated a quarter turn from the position indicated by the circle $b$ under the legend "Unload" to the position shown under the legend "Load."

Referring particularly to Figs. 14 to 19 inclusive, a modification of the present invention is shown wherein the cell gates or covers are different than those hereinbefore described. In this form of the invention a stationary frame is employed to carry a rotatable elevator-conveyor frame, which latter carries a plurality of cells for the carrying of material to be elevated or conveyed. The stationary frame, the elevator-conveyor frame are substantially similar to the frame hereinbefore described except that they are wider to provide for the different movement of the cell gates. The drive for the elevator-conveyor is the same as hereinbefore described, and the elevator-conveyor frame is provided with a brake mechanism, to be hereinafter more fully described, which is the same regardless of the type of cell gates which are employed. In other words the modification relates only to the cell gates and the mechanisms for opening and closing them.

Figure 14:
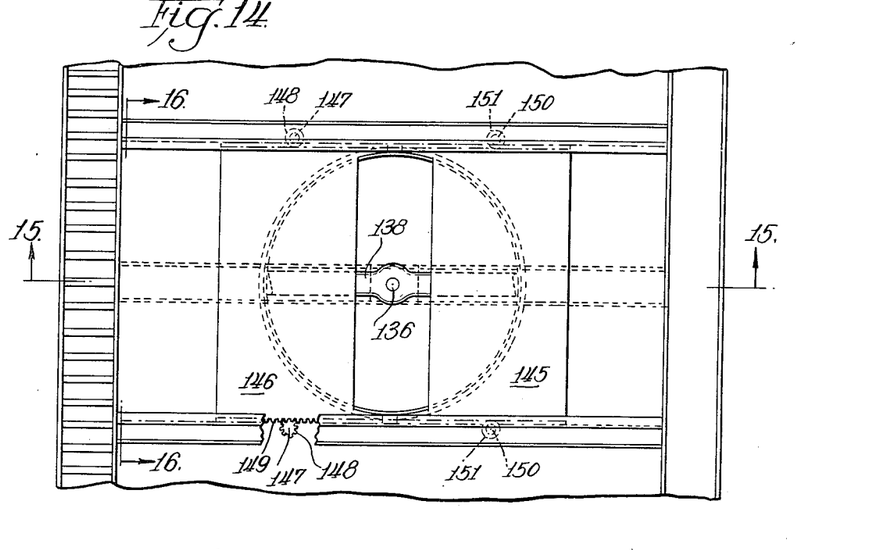
Fig. 14 is a top plan view of a modified gate construction.
Figure 15:
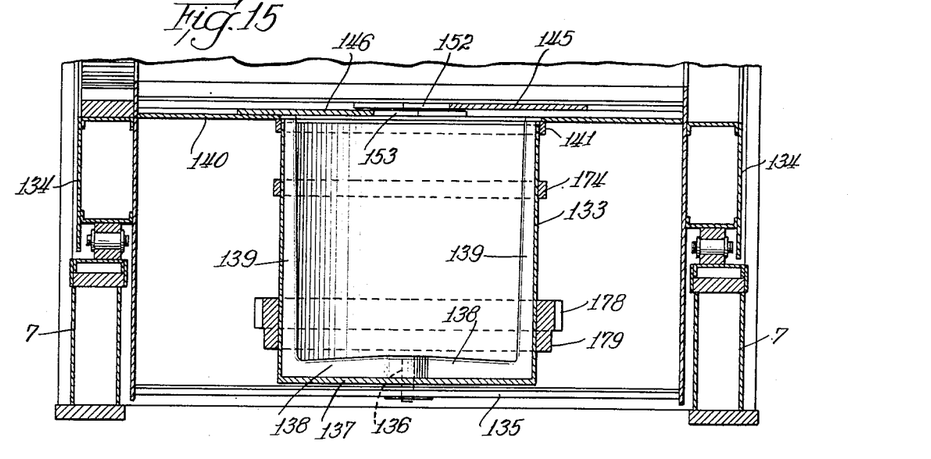
Fig. 15 is a sectional view taken on line 15—15 of Fig. 14.
Figure 16:
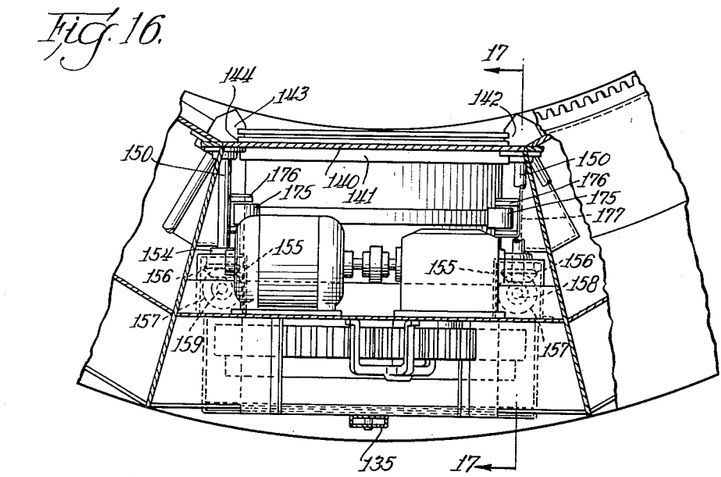
Fig. 16 is a sectional view taken on line 16—16 of Fig. 14.
Figure 17:
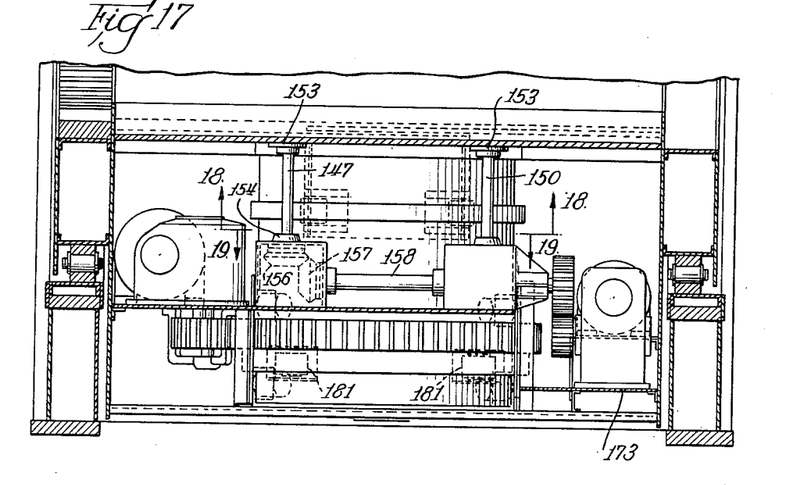
Fig. 17 is a sectional view taken on line 17—17 of Fig. 16.
Figure 18:
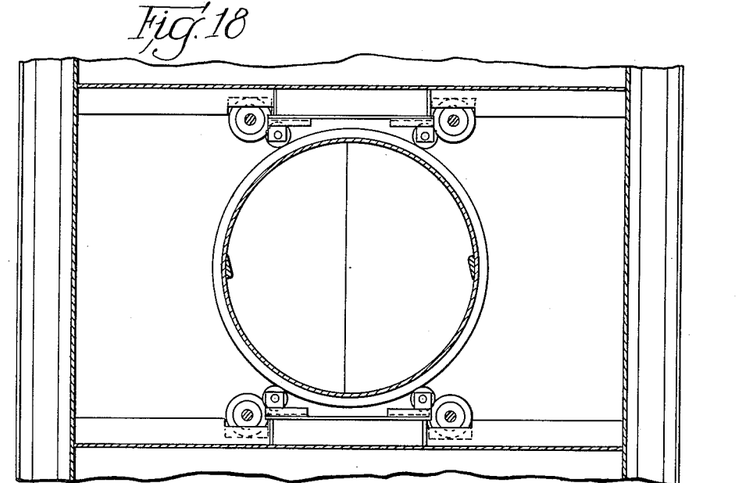
Fig. 18 is a sectional view taken on line 18—18 of Fig. 17.
Figure 19:
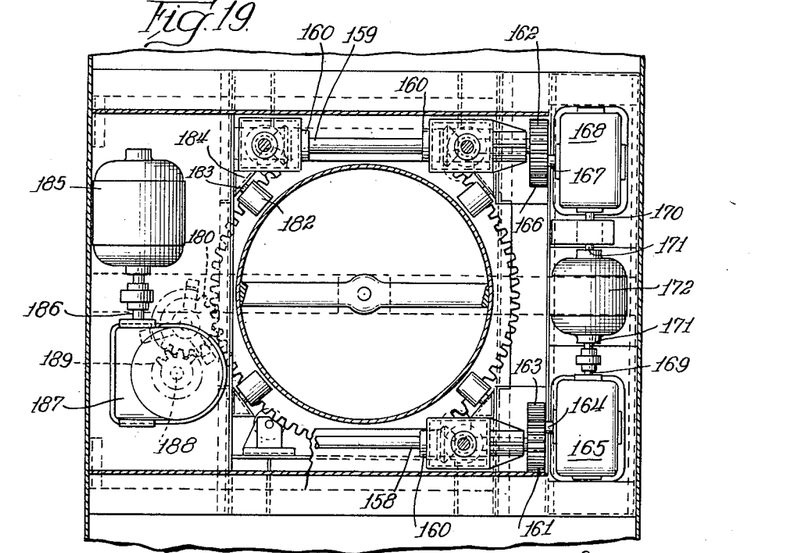
Fig. 19 is a sectional view taken on line 19—19 of Fig. 17.

Referring particularly to Figs. 14 and 15 a plurality of cells 133 are mounted for rotation about their axes between frame members 134 which constitute the main frame members of the elevator-conveyor. Each of the cells 133 and their accompanying mechanisms are the same and for purposes of economy in description but one such unit will be described it being understood that the remainder are all operated the same. A brace 135 extends transversely across the elevator-conveyor frame and carries at its central portion a shaft 136 which extends upward through bottom 137 of cell 133, said cell being rotatable about shaft 136 as an axis. A pair of arms 138 are rigidly secured to shaft 136 and at their ends said arms carry vanes or blades 139 which are disposed in proximity to the inner wall of the cell.

A plate 140 is positioned across the elevator-conveyor frame and is provided with an aperture which registers with the open mouth of the cell 133, plate 140 carrying a ring 141 which loosely embraces the open end portion of the cell. A gate guide 142 is positioned upon plate 140 and is provided with superimposed parallel grooves 143 and 144 for the slidable reception of the opposite edge portions of an upper gate 145 and lower gate 146, respectively, said gates being slidable toward and away from each other to close or open the mouth of the cell 133. A pair of vertical shafts 147 are disposed adjacent one side of cell 133 and each of said shafts carries a pinion 148 which engages with gear teeth 149 formed upon opposite side edges of gate 146. Hence, rotation of shafts 147 results in rectilinear movement of gate 146 in guide 144. Similarly, on the opposite side of the cell 133 a pair of shafts 150 are disposed, each of said shafts also carrying a pinion 151 which mesh with gear teeth (not shown) formed on the opposite side edges of gate 145 whereby said gate may be moved rectilinearly in guide 143. Both gates 145 and 146 carry edge extensions 152 and 153, respectively, which are provided with gear teeth whereby the gates may be moved, when opening the mouth of the cell, to a position where the cell mouth is completely open.

All of the shafts 147 and 150 are journaled in bearings 153 which are carried by plate 140 and by bearings 154 which are carried by frame members 155. At the end of each of the shafts 147 and 150 a bevel gear 156 is carried and each bevel gear meshes with a companion bevel gear 157 carried upon a pair of shafts 158 and 159, which are journaled in bearing 160 also carried on frame members 155. Shaft 158 carries at its end a spur gear 161 and, similarly, shaft 157 carries a spur gear 162 at its end. Spur gear 161 meshes with a spur gear 163 mounted upon output shaft 164 of a conventional speed reducer 165, and spur gear 162 meshes with spur gear 166 carried by the output shaft 167 of a speed reducer 168 which is identical with the speed reducer 165. The input shafts 169 and 170 of the speed reducers 165 and 168, respectively, are connected to shaft 171 of an electric motor 172 which, together with the speed reducers 165 and 168 are mounted upon frame member 173. Thus, shafts 147 and 150 are rotated by motor 172 to open and close gates 145 and 146. When the motor 172 is in operation, the shafts 147 each move in opposite angular directions to impart the same directional movement to gate 146 and in similar fashion shafts 150 move in opposite angular directions. Likewise, shafts 158 and 159 move in opposite angular directions which is secured by the reversed positions of the speed reducers with respect to the motor shafts 171.

A bearing ring 174 is mounted upon each cell and functions as a bearing surface or track for lateral guide rollers 175 which are supported by roller brackets 176, the roller brackets in turn being supported by frame members 177. Thus, the cell 133 is rotatably supported laterally adjacent the open portion thereof.

Also mounted upon the outer surface of each cell, and spaced from the bearing ring 174, is a ring gear 178 and bearing ring 179 which may be formed integral with each other if desired. The ring gear 178 meshes with a pinion 189 and is adapted to be driven by said pinion whereby the cell is rotated about its axis. The bearing ring 179 comprises a race or track for rollers 181 which are carried by brackets secured to a portion of the frame. Thus the closed end portion of each of the cells is laterally supported for rotation about its axis.

Rollers 182 carried upon shafts 183 which, in turn, are supported by frame members 184 are disposed above the ring gear 178 and beneath the bearing ring 179. Said rollers are rotatable about the shafts 183 which, in turn, are disposed horizontally and hence said rollers function as thrust bearings to limit axial movement of the cell 133.

An electric motor 185 is positioned upon the elevator conveyor frame adjacent each cell and the shaft of said motor is connected to input shaft 186 of a conventional speed reducer 187. Output shaft 188 of the speed reducer 187 carries a pinion 189 which meshes with spur gear 190 which, as has been hereinbefore described meshes with the teeth of the ring gear 178. Hence, when motor 185 is energized the cell 133 is rotated about its axis.

The operation of the modified form of the invention illustrated in Figs. 14 to 19 inclusive is similar, in general, to the operation of the device hereinbefore described. However, in view of the fact that one gate motor 172 is associated with each set of cell gates 145 and 146, the operation of opening and closing the gates is somewhat simpler than where the semi-circular gates are employed.

Figure 10:
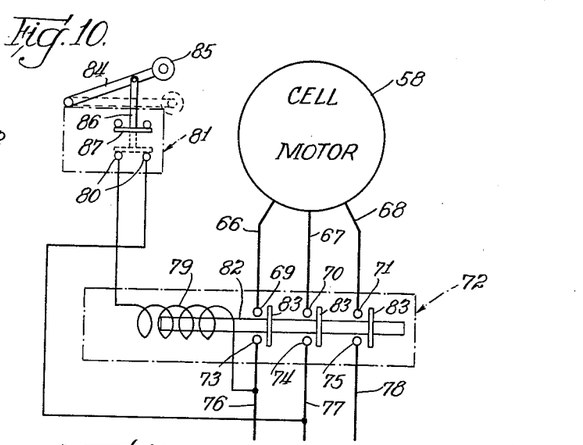
Fig. 10 is a wiring diagram for a cell motor.

In view of the fact that the cells 133 are rotated during a predetermined portion of their travel upon the elevator conveyor, an arrangement similar to that illustrated in Figs. 9 and 10 is employed. In other words, the circuit which includes the cell rotating motor 185 is identical with that shown in Fig. 10. In addition, a cam rail similar to the cam rail 88 is employed to actuate the cell-revolving motor when the cell passes over the discharge conveyor 64 as has been hereinbefore described.

In view of the fact that the gates 145 and 146 merely slide rectilinearly toward or away from each other to close or open the mouth of the cell, cam rails are employed in substantially the positions shown in Fig. 11, that is, the positions occupied by the cam rails 114 and 115. Since there is but one gate motor, but one circuit similar to the circuit illustrated in Fig. 13 is employed with each cell unit. Of course, as the cells pass beneath the feed conveyor 63 the cell gates 146 and 145 are in open position whereby the cell, in question, may be loaded. As the elevator conveyor continues its rotary movement one of the limit switches associated with the motor 172 is actuated by a cam rail disposed in substantially the position of the rail 114. This action causes gates 145 and 146 to move toward each other and close the mouth of the loaded cell. When the cell in question moves over the discharge conveyor 64 the other limit switch comprised in the circuit of motor 172 engages a cam rail disposed in substantially the position of the cam rail 115 whereby the motor 172 is actuated but in a reverse direction. In this fashion the cell gates 145 and 146 are moved away from each other to open the mouth of the cell and permit the material carried therein to be discharged to the discharge conveyor 64. Throughout the remaining portion of the revolution of the conveyor, the cell gates 145 and 146 remain open until after the cell in question is loaded and begins its upward travel with the elevator conveyor. In other words, only two cam rails are employed, one to close the gates and one to open the gates.

In the event that it is desired to stop the rotation of the elevator conveyor, a braking mechanism is provided. The braking mechanism comprises a pair of similar brake shoes 190, each of which is pivoted at one end as at 191 upon a portion of the stationary frame. A link 192 is pivotally connected to one of the shoes 190 and a link 193 is similarly pivoted to the opposite shoe. A master link 194 is pivotally connected at its end to the link 192 and the link 193 is pivoted, as at 195, to an intermediate portion of the master link 194. At its opposite end the master link 194 is pivoted to the end of a piston rod, as at 196 in Fig. 1, said piston rod carrying a piston which reciprocates in a hydraulic cylinder 197. The cylinder 197 receives fluid under pressure from a suitable source (not shown) whereby the linkage, hereinbefore described, is actuated to apply the brake shoes 190. The arcuate portions of the brake shoes 190 act upon a brake drum 198 carried by the stationary frame.

Thus, if conveyor 64, the discharge conveyor, is suddenly stopped, for instance, in an emergency, the elevator conveyor can be immediately stopped whereby the material carried by the traveling cells will not be discharged to a stationary conveyor. This is necessary because of the fact that the elevator conveyor with its cell units, some of which are loaded with material being conveyed, possesses considerable weight and without the braking mechanism hereinbefore described, said elevator conveyor would tend to travel a considerable distance through its own momentum.

It is apparent that herein is provided a mechanism for elevating and conveying material from a lower level to a higher level, the mechanism being characterized in that it occupies a minimum of space and is possessed of mechanisms which permit rapid revolution of the elevator conveyor and rapid discharge of the material from the traveling cells. Modifications of the present invention may be made by anyone skilled in the art and hence I do not wish to be limited except as necessitated by the appended claims.

I claim as my invention:

1. An elevating and conveying device comprising a relatively stationary frame, a rotatable frame mounted upon said stationary frame, means for rotating said rotatable frame, a plurality of open-mouthed cells carried by said rotatable frame for the reception of material to be elevated and conveyed, movable gates upon each of said cells for closing the mouths of said cells, gate moving means connected to each of said gates for opening and closing the gates of each cell, an electric motor carried by said rotatable frame adjacent each cell for actuating said gate moving means, and means carried by said relatively stationary frame at predetermined positions adjacent the path of travel of said cells to actuate said motors when said rotatable frame moves.

2. An elevating and conveying device comprising a relatively stationary frame, a rotatable frame mounted upon said stationary frame, means for rotating said rotatable frame, a plurality of open-mouthed cells carried by said rotatable frame for the reception of material to be elevated and conveyed, movable gates upon each of said cells for closing the mouths of said cells, gate moving means connected to each of said gates for opening and closing the gates of each cell, an electric motor carried by said rotatable frame adjacent each cell for actuating said gate moving means, switch means carried by said rotatable frame for each motor, and means carried by said relatively stationary frame at predetermined positions adjacent the path of travel of said cells to throw said switch means and actuate said motors when said rotatable frame moves.

3. An elevating and conveying device comprising a relatively stationary frame, a rotatable frame mounted upon said stationary frame, means for rotating said rotatable frame, a plurality of open-mouthed cells carried by said rotatable frame for the reception of material to be elevated and conveyed, movable gates upon each of said cells for closing the mouths of said cells, gate moving means connected to each of said gates for opening and closing the gates of each cell, an electric motor carried by said rotatable frame adjacent each cell for actuating said gate moving means, reversible switch means carried by said rotatable frame for each motor, and means carried by said relatively stationary frame at predetermined positions adjacent the path of travel of said cells to throw said switch means and actuate said motors in a predetermined direction when said rotatable frame moves.

4. An elevating and conveying device comprising a relatively stationary frame, a rotatable frame mounted upon said stationary frame, means for rotating said rotatable frame, a plurality of open-mouthed cells carried by said rotatable frame for the reception of material to be elevated and conveyed, feed means for filling said cells with material to be conveyed, movable gates upon each of said cells for closing the mouths of said cells, gate moving means connected to each of said gates for opening and closing the gates of each cell, an electric motor carried by said rotatable frame adjacent each cell for actuating said gate moving means, and means carried by said relatively stationary frame adjacent the path of travel of said cells and adjacent said feed means to actuate said motors and close said cell gates when said rotatable frame moves past said feed means.

5. An elevating and conveying device comprising a relatively stationary frame, a rotatable frame mounted upon said stationary frame, means for rotating said rotatable frame, a plurality of open-mouthed cells carried by said rotatable frame for the reception of material to be elevated and conveyed, feed means for filling said cells with material to be conveyed, receiving means for receiving said material from said filled cells, movable gates upon each of said cells for closing the mouths of said cells, gate moving means connected to each of said gates for opening and closing the gates of each cell, an electric motor carried by said rotatable frame adjacent each cell for actuating said gate moving means, means carried by said relatively stationary frame adjacent the path of travel of said cells and adjacent said feed means to actuate said motors and close said cell gates, and separate means carried by said relatively stationary frame adjacent the path of travel of said cells and adjacent said receiving means for actuating said motors to open said cell gates.

6. An elevating and conveying device comprising a relatively stationary frame, a rotatable frame mounted upon said stationary frame, means for rotating said rotatable frame, a plurality of open-mouthed cells carried by said rotatable frame for the reception of material to be elevated and conveyed, movable gates upon each of said cells for closing the mouths of said cells, gate moving means connected to each of said gates for opening and closing the gates of each cell, an electric motor carried by said rotatable frame adjacent each cell for actuating said gate moving means, switch means carried by said rotatable frame for each motor, and means carried by said relatively stationary frame at predetermined positions adjacent the path of travel of said cells to throw said switch means and actuate said motors when said rotatable frame moves.

7. An elevating and conveying device comprising a relatively stationary frame, a rotatable frame mounted upon said stationary frame, means for rotating said rotatable frame, a plurality of open-mouthed circular-sectioned cells carried by said rotatable frame for the reception of material to be elevated and conveyed, means connected to each cell for rotating the same about its axis, stationary scraper means carried within each cell for agitating the material carried therein when said cell is rotated, an electric motor carried by said rotatable frame adjacent each cell for driving each cell rotating means, and means carried by said stationary frame for actuating said electric motors at a predetermined portion of travel of said rotatable frame.

8. An elevating and conveying device comprising a relatively stationary frame, a rotatable frame mounted upon said stationary frame, means for rotating said rotatable frame, a plurality of open-mouthed circular-sectioned cells carried by said rotatable frame for the reception of material to be elevated and conveyed, means connected to each cell for rotating the same about its axis, stationary scraper means carried within each cell for agitating the material carried therein when said cell is rotated, an electric motor carried by said rotatable frame adjacent each cell for driving each cell rotating means, a limit switch connected in circuit with each motor and carried by said rotatable frame, and an arcuate cam rail carried by said stationary frame at a predetermined arcuate situs adjacent said rotatable frame for actuating said limit switches to energize said motors.

9. An elevating and conveying device comprising a relatively stationary frame, a rotatable frame mounted upon said stationary frame, means for rotating said rotatable frame, a plurality of open-mouthed circular-sectioned cells carried by said rotatable frame for the reception of material to be elevated and conveyed, means connected to each cell for rotating the same about its axis, stationary scraper means carried within each cell for agitating the material carried therein when said cell is rotated, an electric motor carried by said rotatable frame adjacent each cell for driving each cell rotating means, means carried by said stationary frame for actuating said electric motors at a predetermined portion of travel of said rotatable frame, movable gates upon each of said cells for closing the mouths of said cells, gate moving means connected to each of said gates for opening and closing the gates of each cell, a gate-operating electric motor carried by said rotatable frame adjacent each cell for actuating said gate moving means, and means carried by said relatively stationary frame adjacent said first-mentioned motor actuating means for actuating said gate operating motors.

10. An elevating and conveying device comprising a relatively stationary frame, a rotatable frame mounted upon said stationary frame, means for rotating said rotatable frame, a plurality of open-mouthed cells carried by said rotatable frame for the reception of material to be elevated and conveyed, a pair of substantially semi-circular gates upon each of said cells for closing the mouths of said cells, gate moving means connected to each pair of gates for rotating said gates to open and close the cell mouth, a pair of electric motors disposed adjacent each cell, one for operating each gate moving means, and means carried by said relatively stationary frame at predetermined positions adjacent the path of travel of said cells to actuate said motors as said rotatable frame moves.

11. An elevating and conveying device comprising a relatively stationary frame, a rotatable frame mounted upon said stationary frame, means for rotating said rotatable frame, a plurality of open-mouthed cells carried by said rotatable frame for the reception of material to be elevated and conveyed, a pair of substantially semi-circular gates upon each of said cells for closing the mouths of said cells, gear teeth upon the arcuate periphery of each gate, gears in mesh with said gate gear teeth to rotate said gates, motors for driving said gears, and means carried by said relatively stationary frame a predetermined position adjacent the path of travel of said cells to actuate said motors as said rotatable frame moves.

12. An elevating and conveying device comprising a relatively stationary frame, a rotatable frame mounted upon said stationary frame, means for rotating said rotatable frame, a plurality of open-mouthed cells carried by said rotatable frame for the reception of material to be elevated and conveyed, substantially rectangular rectilinearly movable gates upon each of said cells for closing the mouths of said cells, gate moving means connected to each of said gates for opening and closing the gates of each cell, an electric motor carried by said rotatable frame adjacent each cell for actuating said gate moving means, and means carried by said relatively stationary frame at predetermined positions adjacent the path of travel of said cells to actuate said motors when said rotatable frame moves.

13. An elevating and conveying device comprising a relatively stationary frame, a rotatable frame mounted upon said stationary frame, means for rotating said rotatable frame, a plurality of open-mouthed cells carried by said rotatable frame, a plurality of open-mouthed cells carried by said rotatable frame for the reception of material to be elevated and conveyed, a pair of substantially rectangular rectilinearly movable gates upon each of said cells for closing the mouths of said cells, gear teeth upon opposite side edges of each cell gate, pinions engageable with said gear teeth, an electric motor carried adjacent each cell for rotating said pinions to move said gates to open and close said cell mouths, and means carried by said relatively stationary frame at predetermined positions adjacent the path of travel of said cells to actuate said motors as the rotatable frame moves.

14. An elevating and conveying device comprising a relatively stationary frame, a rotatable frame mounted upon said stationary frame, means for rotating said rotatable frame, a plurality of circular-sectioned open-mouthed cells carried by said rotatable frame for the reception of material to be elevated and conveyed, each of said cells being rotatable about its axis, stationary blades carried within each cell for agitating the material carried therein when the cell rotates, an electric motor for rotating each cell, means carried by said stationary frame at a predetermined position adjacent the path of travel of said cells to actuate said cell motors, a pair of substantially rectangular rectilinearly movable gates upon each of the cells for closing the mouths of said cells, an electric motor carried adjacent each cell for moving said gates rectilinearly to open and close each cell mouth, and means carried by said relatively stationary frame at predetermined positions adjacent the path of travel of said cells to actuate said gate operating motors as the rotatable frame moves.

No references cited.